Patented Dec. 15, 1942

2,305,220

UNITED STATES PATENT OFFICE 2,305,220

CONVERSION OF HYDROCARBONS

David A. Legg, Terre Haute, Ind., assignor to The Lummus Company, New York, N. Y., a corporation of Delaware No Drawing. Application September 19, 1939, Serial No. 295,569

9 Claims. (Cl. 196—52)

This invention relates to a process for producing or promoting chemical transformation of petroleum, such as cracking, reforming, and the like, wherein a catalyst is employed. More particularly, this invention relates to a process of converting relatively heavy hydrocarbons into gasoline-like hydrocarbons of high octane number by the use of an improved type of catalytic material, and also relates to a process of reforming low octane motor fuel whereby the octane number thereof is materially increased.

Various types of hydrated aluminum silicates, diatomaceous earths, etc. have long been used to catalytically treat petroleum products. Their use in connection with the cracking of heavy hydrocarbons into lighter hydrocarbons has not been widespread primarily because of the difficulty of securing a suitable material that will give an efficient and economic performance.

Hydrated aluminum silicates may be obtained either naturally, as the commonly occurring clays or clay-like substances, or synthetically, as prepared materials of predetermined composition. The naturally occurring silicates have been considered inferior to the synthetic silicates; they have been utilized only on a small scale in some cases and have been entirely rejected in others. These natural silicates are usually of such composition or in such physical state that it has been necessary to treat them with acid, such as sulfuric or hydrochloric, or with other chemicals to render them sufficiently active for practical use in catalytic cracking.

The prior art contains many suggestions for compositions of hydrated aluminum silicates for use in the cracking of hydrocarbons. It has been found, however, that many of these prepared hydrosilicates, even though catalytically active, have a short life and a short period of activity and are not capable of continued regeneration by economically feasible methods. Furthermore, the catalytic activity of the prepared hydrosilicates is generally less after each reactivation treatment.

It has been proposed in several instances, in order to overcome the loss in activity upon regeneration of the catalyst and the difficulty of reactivating the catalyst, to narrowly limit the variation in composition of the catalytic material. Although the activity has thereby been increased and the life lengthened, it has been found that the carbon deposition on the catalyst is often greater and that the temperature during the catalytic reaction and especially during the reactivation operation must be controlled carefully within a very limited range to prevent damage to the catalyst.

The object of my invention is to provide a process in which relatively heavy hydrocarbons are converted into lighter hydrocarbons by the use of a catalytic material which is inexpensive to prepare, which gives a substantial yield per pass, which maintains its activity over long periods of continued regeneration, and which may be regenerated under severe temperature conditions without resultant damage to its activity.

Further objects and advantages of my invention will be apparent from the following description of a preferred form of embodiment thereof.

The underlying feature of my invention is the production of relatively high octane gasoline by the use of an inexpensive catalyst which has a much longer life and period of activity than other known catalysts. Furthermore, during regeneration of this catalyst close temperature control, which has heretofore been required, is unnecessary since the catalyst can withstand temperatures considerably higher than those customarily used without losing its activity. In addition, the catalyst is of such a nature that its activity drops relatively slowly with length of use so that it does not need to be regenerated so frequently. For these reasons this catalyst, when cost, yield, and octane number are considered, can be used more economically than most of the so-called superior types of catalyst.

I have discovered that I can obtain a substantial conversion of relatively heavy hydrocarbon material, such as kerosene, gas oil, and the like, to lighter hydrocarbons by subjecting the heavy hydrocarbons under suitable conditions of temperature and pressure to the action of a catalytic substance comprising a hydrosilicate of aluminum of particular chemical composition and physical characteristics. Furthermore, I am able to obtain a gasoline of relatively high octane number by use of this hydrosilicate catalyst.

I prefer to utilize a naturally occurring hydrosilicate as my catalyst although it may also be possible to synthesize a material of similar composition from substances containing the various components thereof. The naturally occurring silicate can be obtained relatively inexpensively and has a hardness, a fineness of porosity, and a bulk specific gravity that meet the requirements which I have found necessary for best performance. The description of my invention will be based upon this naturally occurring material.

The catalytic material is a hydrated aluminum silicate having a composition falling within the following range (dry basis):

| | Weight per cent |
|---|---|
| $SiO_2$ | 45 to 55 |
| $Al_2O_3$ | 55 to 45 |
| CaO, $Fe_2O_3$, MgO, etc. | 0 to 5 |

It will be noted that the silica and alumina are present in a ratio of from 0.8/1.0 to 1.2/1.0 by weight and together comprise from 95 to 100% by weight of the catalyst.

I find that the best results can be obtained with a catalyst containing silica and alumina in approximately equal proportions by weight and containing preferably less than 2% by weight of other materials. An analysis on wet and dry bases of a typical sample of this silicate follows:

| | Wet basis | Dry basis |
|---|---|---|
| | Weight per cent | Weight per cent |
| $SiO_2$ | 40.10 | 49.65 |
| $Al_2O_3$ | 39.95 | 49.45 |
| CaO | 0.14 | 0.17 |
| $Fe_2O_3$ | 0.48 | 0.59 |
| MgO | 0.11 | 0.14 |
| Combined $H_2O$ | 14.50 | |
| Moisture | 4.85 | |

The analysis indicates that the catalyst has an empirical formula approximating $$3Al_2O_3 \cdot 5SiO_2 \cdot 6H_2O$$

This silicate occurs in large deposits in southern Indiana and elsewhere. It apparently belongs to the mineral group which includes halloysite and has been described by various geologists under such names as halloysite, indianaite, and others. Its empirical chemical formula approaches that assigned to halloysite (see "Kaolin of Indiana," W. N. Logan, Department of Conservation, Division of Geology, Indianapolis, Indiana (1919)).

To insure optimum performance, I find that this catalyst material should have a fine porosity, a relatively high bulk specific gravity, and a relatively high degree of hardness. The high bulk specific gravity and the high degree of hardness influence the conditions under which the catalyst can be reactivated. Regeneration can be carried out at the high temperatures produced by the combustion of the carbon deposition without close control of the temperature of regeneration and without complicated cooling equipment to remove the heat generated and thereby avoid damage to the catalyst. Variations in temperature throughout the catalyst mass during regeneration are relatively slight because of the good heat conductivity of the catalytic material resulting from its high bulk specific gravity.

Tests on various samples of this silicate indicate that it has a very fine porosity, a bulk specific gravity of over 1.50, and a hardness of over 2.5 (Mohs' scale). The silicate which I prefer to use as my catalyst has a bulk specific gravity of from 1.50 to 1.75, an absolute specific gravity of from 2.40 to 2.55, and a hardness of from 2.5 to 3.5 (Mohs' scale).

The silicate is ordinarily white; but it may also be bluish green, pinkish, pale yellow, or pale gray, for example, according to the type of impurities which it may contain. It occurs most commonly as a white to pale gray mineral. It may be distinguished from china clays and kaolin, which are ordinarily white, by its rock-like nature, its absence of friability, and its relatively non-plastic character. It shows a vitreous to conchoidal fracture when broken. When heated to a temperature above 700° F., it becomes decidedly harder and shows no tendency to decrepitate. When subjected to ordinary mechanical treatment, either before or after heating, it does not tend to pulverize.

For use in the treatment of hydrocarbons, the silicate is broken up into particles preferably not over ½" in maximum dimension. Before being used, the catalyst particles may be baked at the temperature of cracking for a length of time sufficient to drive off the moisture and the water of hydration; the particles may also be used directly without any preliminary baking. I have found that treatment of this silicate with acid does not improve its activity and that the addition of special materials, such as activated silica and certain metals or metallic oxides, to increase its activity or to improve subsequent regeneration, is not necessary.

When cracking hydrocarbons by using this silicate as a catalyst, I find that I can obtain over relatively long periods of time good yields of lighter hydrocarbon material, a considerable portion of which is suitable for use as gasoline. The octane number of this gasoline is materially higher than that of thermally cracked gasoline from the same charge stock. Generally, the yield per pass decreases with the length of time the catalyst is used; but the octane number of the gasoline does not show a corresponding drop. The silicate is thus capable of reforming low octane gasoline.

I have found that the pressure range for most effective yields can vary in the range from atmospheric pressure to approximately 200 pounds per square inch. The higher pressures, however, increase the thermal cracking, which tends to reduce the octane number of the gasoline. I have found that the range of atmospheric pressure to 50 pounds per square inch is best for best yields of high octane gasoline unless special means are provided to supply the necessary endothermic heat in and throughout the catalyst mass. At such pressures, the most effective temperature for the reaction appears to be from 850 to 900° F. and preferably about 870° F.

This catalytic material may be readily regenerated by passage of a current of air over the contaminated silicate to burn off the carbon deposited thereon without the employment of special means to remove the heat of combustion of the carbon. The regenerated silicate gives results as good as those obtained with fresh silicate.

The following example illustrates typical results obtained by cracking a Pennsylvania gas oil by this natural aluminum silicate. This gas oil had a gravity of 39.4° A. P. I. and a boiling range from 535° F. to 650° F. Such gas oil, when cracked thermally, gave a gasoline having an octane number of 65.

The gas oil was vaporized and the vapors were passed at an elevated temperature over catalyst particles approximately ¼" in maximum diameter. The vapors were introduced into the catalyst chamber, the temperature of which was maintained at about 870° F. A pressure of approximately 50 pounds per square inch was found most satisfactory in that it gave a relatively high crack per pass. A stream of gas oil vapors was passed continuously through the chamber for a period of five hours.

Composite samples were taken during the first and the fifth hours of the run. The first hour sample indicated a yield of 25.2% by volume of gasoline having an octane number of 79.0. The fifth hour sample showed a yield of 16.4% by volume of gasoline having an octane number of 77.0. The color of the gasoline in both cases was pale straw.

At the end of the five-hour run the catalyst was removed from the chamber and placed in an oven, in which it was regenerated at a temperature considerably higher than 1100° F. without particular regard to exact control. The regenerated catalyst gave results practically identical with those obtained with the fresh catalyst. Continued use of the same catalyst material after frequent regenerations indicated that its activity decreased only slightly with use.

While I have described a preferred form of embodiment of my invention, I am aware that modifications may be made thereto, and I, therefore, desire a broad interpretation of my invention within the scope and spirit of the description herein and of the claims appended hereinafter.

I claim:

1. The process of chemically transforming hydrocarbon material unsatisfactory for use as a motor fuel into a high anti-knock gasoline, which comprises contacting said unsatisfactory hydrocarbon material in the vapor state and under elevated temperature and pressure conditions with a catalytic material comprising an aluminum silicate in which the silica and alumina are present in the ratio of 0.8/1 to 1.2/1 by weight, said catalytic material being characterized by its fine porosity and having a bulk specific gravity above 1.50 and a Mohs hardness above 2.5.

2. The process as claimed in claim 1, in which the catalytic material comprises a naturally occurring hydrosilicate of aluminum substantially corresponding to the empirical formula $3Al_2O_3.5SiO_2.6H_2O$, said silicate having a very fine porosity, a bulk specific gravity of above 1.50 to 1.75, and a Mohs hardness ranging from above 2.5 to 3.5.

3. The process of increasing the antiknock qualities of motor fuel which comprises the steps of vaporizing the fuel and passing such heated vapors through a zone maintained at a temperature in excess of 850° F. and under a pressure of approximately fifty pounds per square inch, and contacting such vapors in such zone with a catalytic material comprising an aluminum silicate containing alumina and silica in substantially equal proportions by weight, such catalytic material being characterized by its being a naturally occurring substance, having a Mohs hardness above 2.5 and having a high degree of porosity.

4. The process of cracking relatively heavy hydrocarbons in to lighter gasoline-like hydrocarbons, which comprises vaporizing said heavy hydrocarbons and contacting the resulting vapors at a temperature in excess of 850° F. and under a pressure ranging from atmospheric to 200 pounds per square inch with a catalytic material comprising an aluminum silicate containing alumina and silica in substantially equal proportions by weight, said catalyst having a very fine porosity, a bulk specific gravity of above 1.50 to 1.75, and a Mohs hardness ranging from above 2.5 to 3.5.

5. The process as claimed in claim 4, in which the relatively heavy hydrocarbons comprise material boiling within the range of gas oil, the temperature is between 850 and 900° F., and the pressure is between atmospheric and 50 pounds per square inch.

6. A catalytic mass for converting and treating hydrocarbons and adapted for frequent regenerations by oxidation without substantial loss of its catalytic activity, consisting of a hydrosilicate of aluminum comprising $SiO_2$ and $Al_2O_3$, to the extent of at least 95%, these components being substantially in the ratio of 0.8/1 to 1.2/1 by weight, and being characterized by its fine porosity and having a bulk specific gravity above 1.50 and a Mohs hardness above 2.5.

7. A catalytic mass as claimed in claim 6, in which the material is baked at a temperature at least that of cracking for a sufficient period of time to substantially dehydrate the mass.

8. A catalytic mass as claimed in claim 6, in which the material is a naturally occurring material and is reduced to particles not over one-half inch in maximum dimension and is baked at the temperature of cracking for a length of time sufficient to drive off the moisture and the water of hydration.

9. A catalytic mass for converting and treating hydrocarbons having selective adsorptive properties and capable of frequent regeneration in situ, consisting of an activated hydrosilicate of aluminum comprising the following components in substantially the given proportions on a dry basis:

| | |
|---|---|
| $SiO_2$ | 49.65 |
| $Al_2O_3$ | 49.45 |
| $CaO$ | 0.17 |
| $Fe_2O_3$ | 0.59 |
| $MgO$ | 0.14 | said material being an untreated natural product baked for a sufficient period of time to remove the water of hydration and moisture and having a high degree of porosity, a bulk specific gravity of above 1.50 to 1.75, and a Mohs hardness ranging from above 2.5 to 3.5.

DAVID A. LEGG.